Nov. 14, 1933.    J. F. T. ENGBLOM ET AL    1,935,021
CALCULATING OR INDICATING APPARATUS
Filed Oct. 26, 1932    3 Sheets-Sheet 1
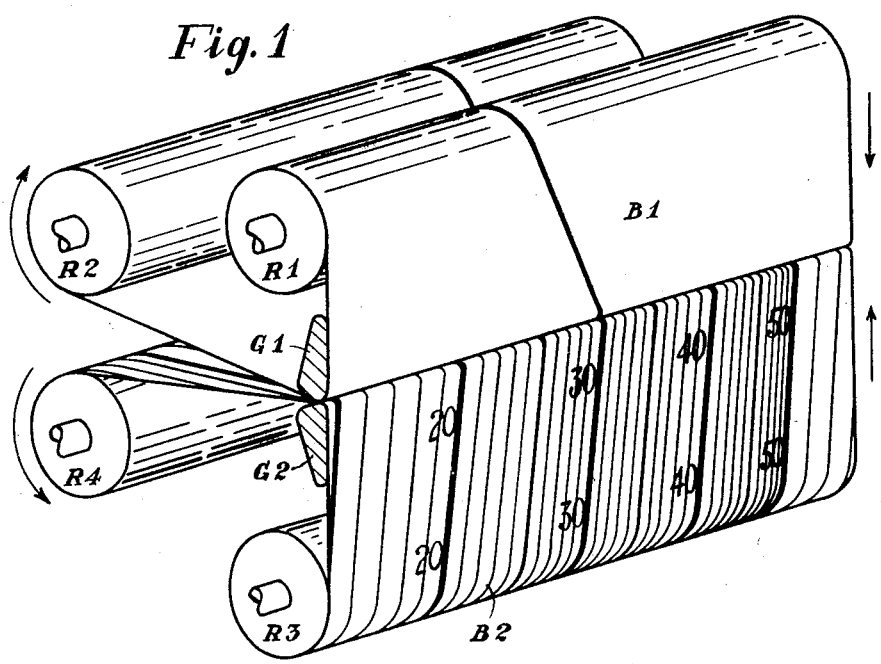
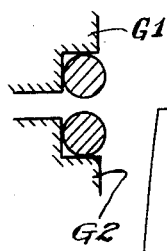
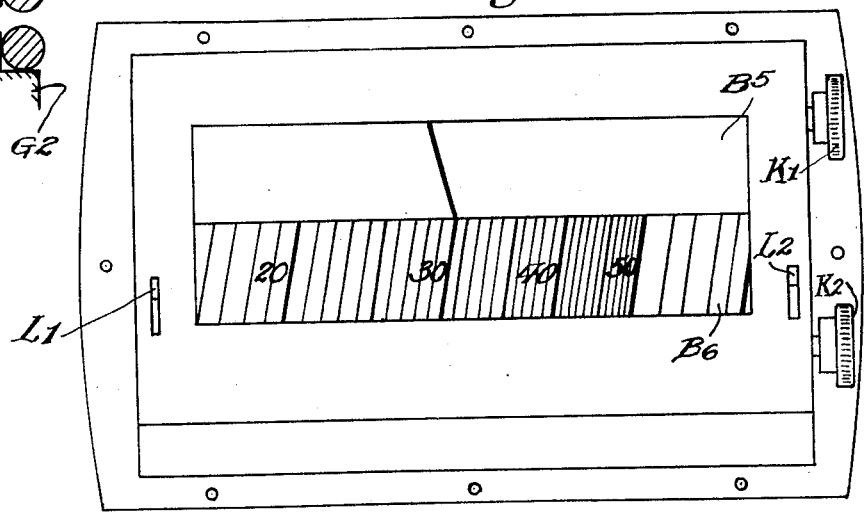

Nov. 14, 1933.   J. F. T. ENGBLOM ET AL   1,935,021
CALCULATING OR INDICATING APPARATUS
Filed Oct. 26, 1932   3 Sheets-Sheet 2

Witnesses.   Inventors.

Nov. 14, 1933.   J. F. T. ENGBLOM ET AL   1,935,021
CALCULATING OR INDICATING APPARATUS
Filed Oct. 26, 1932    3 Sheets-Sheet 3

Witnesses.    Inventors.

Patented Nov. 14, 1933

1,935,021

UNITED STATES PATENT OFFICE 1,935,021

CALCULATING OR INDICATING APPARATUS

John Fredrik Teodor Engblom and Charles Wilfrid Wilman, Beeston, England

Application October 26, 1932, Serial No. 639,714, and in Great Britain November 18, 1931

4 Claims. (Cl. 235—86)

Our invention relates to calculating or indicating apparatus and particularly to apparatus adapted to calculate and/or display a quantity which is a function of at least two variables. It has a special application in the measurement of average values; for example, it may be employed to measure average speed, in which case it will be required to operate upon variable factors representing time and distance.

According to our invention we provide apparatus for calculating and continuously displaying the resultant of two variable factors in which two movable flexible bands bear curves such that the coming together of the bands by their passing through a common slot at points in their lengths determined by the variable factors to be combined enables the required resultant to be read off directly on one of them.

In the application of our invention to apparatus for calculating average speed the two flexible bands may be moved according to time and distance factors respectively and may carry curves displaced laterally and logarithmically with respect to their directon of movement, so that the co-operation of a single curve carried by one band with a logarithmic series of curves carried by the other enables a direct reading of average speed to be obtained.

The bands may be either endless or adapted to be rolled from one roller to another, and may be brought into juxtaposition by their coming together over a flat surface and turning down into a common slot. It is, of course, immaterial whether the actual movement of the bands is into or out of the slot. Any other suitable method of bringing the bands into actual or apparent juxtaposition at any points in their length may be employed if desired.

The following description should be read in conjunction with the accompanying drawings, in which:—

Figure 1 illustrates the principle of one form of our invention,

Figure 2 shows a modification of a detail in Figure 1,

Figure 4:
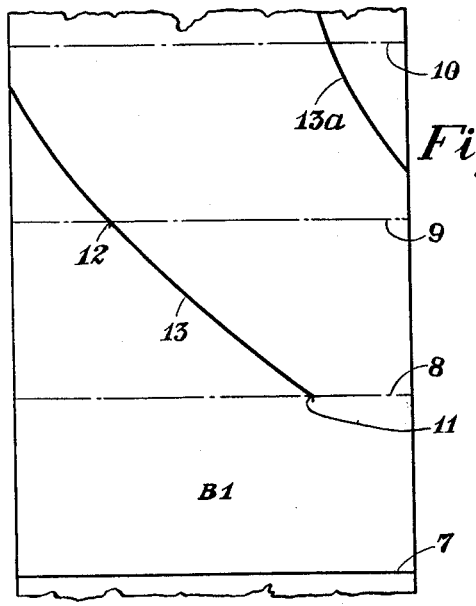
Figure 5:
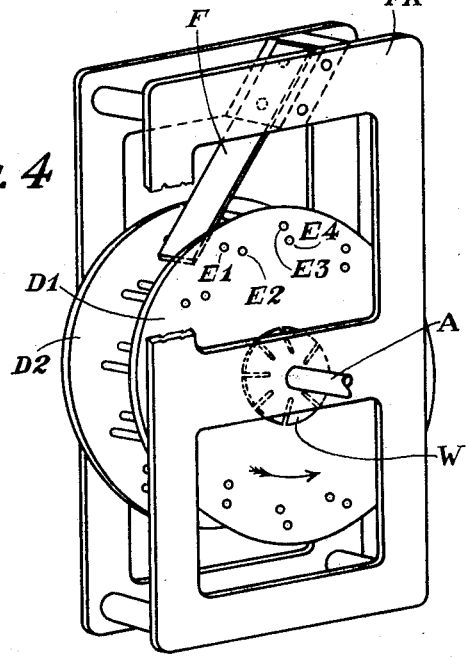
Figure 3:
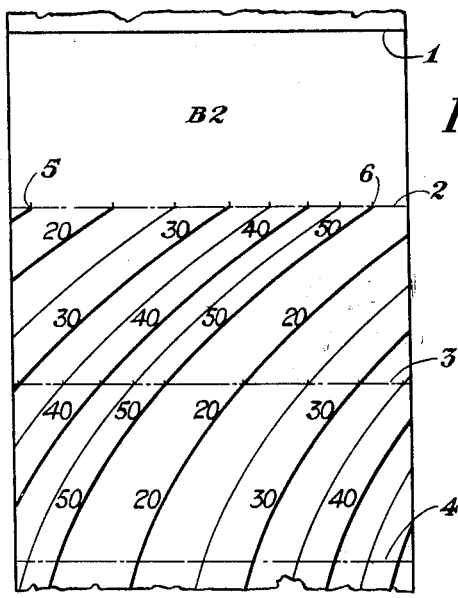
Figure 6:
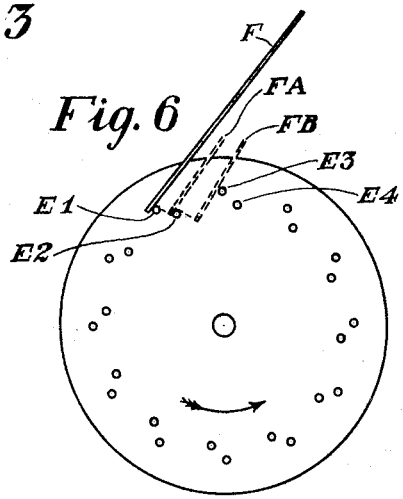
Figure 7:
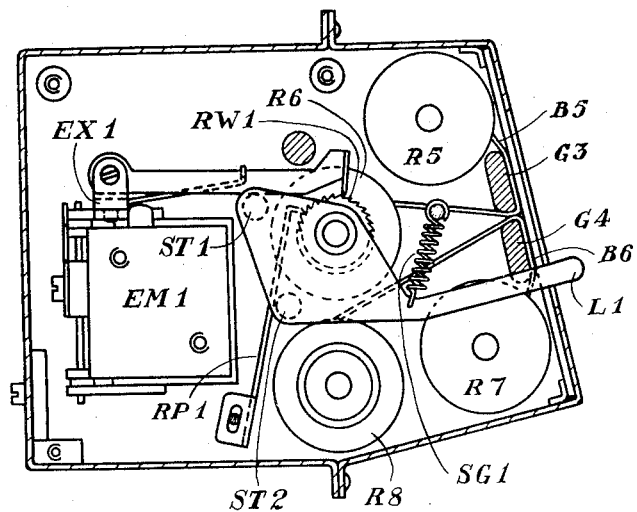
Figure 8:
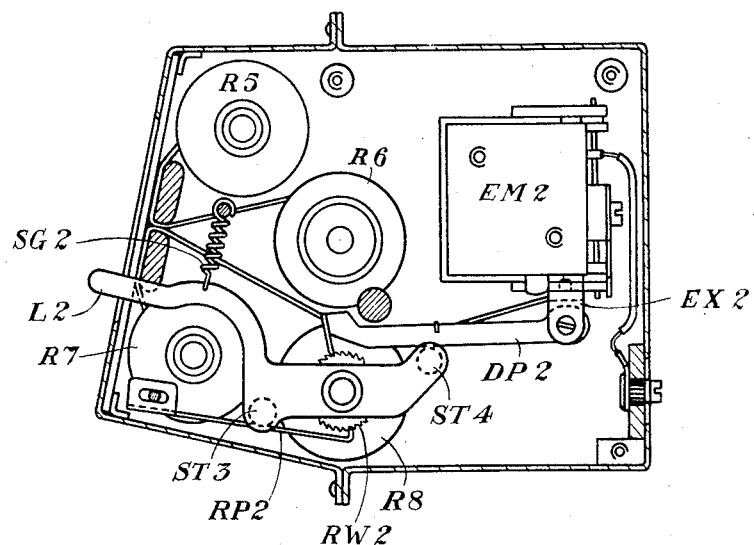

Figures 3 and 4 illustrate the manner of constructing the bands shown in Figure 1, Figures 5 and 6 illustrate an electrical impulse generating device for use in conjunction with our invention, Figures 7, 8 and 9 are views of an average speed meter embodying our invention.

In Figure 1, a flexible band B1 is wound from a roller R1 to a roller R2, while another band B2 is wound from a roller R3 to a roller R4. Both bands pass through a slot between guide bars G1 and G2 and are thus brought into juxtaposition. If desired, the guide bars G1 and G2 may be provided with small diameter rollers as indicated in Figure 2, held in position by bearings placed outside the width of the bands.

It is assumed that the device is to be used as an average speed meter and one band (B2) is therefore moved according to the distance traveled and the other (B1) according to time. In this case the resultant required is distance divided by time, and the bands are marked logarithmically.

Figures 3 and 4 illustrate the method of constructing the bands. In Figure 3, lines 1, 2, 3, 4 are drawn across the band B2 at right angles to its length, each line being spaced from the next by the distance moved by the band during a definite angular movement (say one turn) of roller R4 (Figure 1). Line 1 is drawn across the part of the band which is just about to enter the slot when the movement of the band commences.

Along line 2 is marked a series of points forming a logarithmic scale. In the example chosen for illustration, the scale extends from the point 5 to the point 6 and represents the logarithms of numbers from 15 to 50. It is therefore equivalent to the markings of a slide rule between corresponding limits, and may be subdivided as desired. For the sake of clearness, however, most of the subdivisions are omitted in Figure 3. The scale is repeated in cyclic manner to the left of point 5 and the right of point 6, each of these points therefore representing speeds of both "15" and "50" miles per hour.

Line 3 is marked with a similar logarithmic scale, but in this case the whole series of points is shifted to the left by an amount determined by the distance moved by the vehicle in causing the band to move the distance between the lines 2 and 3. Thus, if the rate of movement of the band is such that line 2 arrives at the slot when the vehicle has travelled ten miles and line 3 arrives at the slot when the vehicle has travelled twenty miles, then the displacement of the points on line 3 as compared with those on line 2 will be equal to the distance between "ten" and "twenty" as measured on a logarithmic scale similar to that used for marking lines 2 and 3 but not, of course, restricted to the portion of its length (from "fifteen" to "fifty") actually appearing on these lines. Succeeding lines such as 4 are marked with similar scales displaced in corresponding manner. Corresponding points on the various lines are then joined, thus providing the average speed curves shown in the drawings. It will be observed that it is not possible to commence the curves at the line 1 owing to their continually increasing slope as they approach this line. It is therefore not possible to obtain an average speed reading until line 2 enters the slot.

In Figure 4, lines 7, 8, 9, 10 are drawn across the band B1 at right angles to its length, each line being spaced from the next by the distance moved by the band during a definite angular movement (say one turn) of roller R2 (Figure 1). Line 7 is drawn across the part of the band which is just about to enter the slot when the movement of the band commences.

On line 8 is marked a point 11 such that if line 8 arrives at the slot at the same time as line 2 on band B2, point 11 will indicate on the scale on line 2 the average speed corresponding to the simultaneous arrival of lines 8 and 2 at the slot. On line 9 is marked a point 12 such that if line 9 arrives at the slot at the same time as line 2 on band B2, point 12 will indicate on the scale on line 2 the average speed corresponding to the simultaneous arrival of lines 9 and 2 at the slot. Corresponding points are marked on succeeding lines, and indicating curves 13, 13a are drawn through the series of points. It will be observed that curves 13 and 13a are really detached portions of the same curve, the distance between them (measured at right angles to the length of the band) being the same as that between points 5 and 6 in Figure 3.

If the distance from line 7 to line 8 is equal to that from line 1 to line 2, curves 13 and 13a can be drawn as soon as point 11 has been fixed, since they are then equivalent to the reflection of the particular curve on band B2 which represents the average speed corresponding to the simultaneous arrival at the slot of lines 2 and 3. As in the case of band B2, it is not possible to continue the curves far enough to obtain a reading immediately the band commences to move. Apart from this limitation, which applies only to a short period at the commencement of the journey, curves drawn in the manner described above give a correct reading of average speed no matter at what points the bands come into juxtaposition.

Alternatively, the series of average speed curves could be drawn on band B1 and the single indicating curve on band B2.

The bands may be of any required length, according to the time and distance for which provision is required and the rate of movement. When any particular curve reaches one side of the band it re-appears on the opposite side, so that at all points a proper reading is possible. In order to facilitate reading when the indicating curve on band B1 is near one side, the width of the bands is somewhat greater than that required for one cycle of the scale, so that a particular curve is visible on one side for a short time or distance before it ceases to be visible on the other.

If desired, one or more of the average speed curves may be of a distinctive colour in order to assist in the ready identification of the curves.

The increasing diameter of the turns as the bands are wound may be allowed for in plotting the curves. This can readily be done by marking on the bands cross lines corresponding to each revolution of the rollers and plotting the curves accordingly.

The time band may be driven continuously, in which case the average speed inclusive of stops will be given, or it may be driven only while the distance band is moving, in which case the reading obtained will be exclusive of stops.

It will be noted that our invention requires no special gearing giving a non-uniform motion to the bands, and that by the arrangement proposed we are able, in effect, to move independently two co-operating scales according to any desired function, for example, the logarithm, of the amount of movement imparted to the bands. We do not, however, exclude the case in which the bands are moved non-uniformly; thus, it has been stated that the increasing diameter of a rolled band may be allowed for. In a similar manner allowance may be made for a change in the rate of movement at a particular point in the length of a band; for example, in order to obtain a high degree of accuracy over widely differing distances or times the bands might be arranged to move quickly for a certain proportion of their lengths and then more slowly.

In the above example the source of driving power for the bands has not been indicated and any suitable arrangement may be employed. For example, in an average speed meter for use on a vehicle the time band may be driven by a clockwork motor designed to keep sufficiently accurate time and the distance band by a speedometer-type drive from the vehicle wheels or transmission system. An alternative arrangement is to drive the bands electrically and this method is adopted in the case of the average-speed meter shown in Figures 7, 8 and 9.

Figure 7 is a part-sectional left hand view of the meter, Figure 8 a similar right hand view, and Figure 9 a front view. A time band B5 is wound from roller R5 to roller R6 and a distance band B6 is wound from roller R7 to roller R8. The bands pass over guide bars G3 and G4, the general arrangement and the markings on the bands being similar to that shown in Figure 1. It will be noted, however, that considerations of space have necessitated band B5 being wound on the roller R6 in a direction opposite to that employed in the case of band B1 and roller R2 in Figure 1.

Rollers R6 and R8 are driven by electromagnets EM1 and EM2 respectively. The cores of these magnets lie at right angles to the planes of Figures 7 and 8. These figures show rear views of the magnets, the armatures being pivoted at the ends not shown. The armature of magnet EM1 carries an extension piece EX1 to which driving pawl DP1 is pivoted. When the armature operates pawl DP1 moves ratchet wheel RW1 forward one tooth, in which position it is retained by retaining pawl RP1 when driving pawl DP1 falls back to gather another tooth upon the release of the armature. Ratchet wheel RW1 is fixed to roller R6 and band B5 is therefore moved forward a distance corresponding to a definite angular movement of roller R6 at each operation of the magnet.

In a similar manner band B6 is moved forward by the operation of magnet EM2 through the agency of armature extension piece EX2, driving pawl DP2, ratchet wheel RW2, and retaining pawl RP2.

In order that the bands may be readily returned to their starting position, winding knobs K1 and K2 are fixed to rollers R5 and R7. Levers L1 and L2, pivoted loosely on the spindles of rollers R6 and R8 respectively, project outside the case of the instrument in order that they may be depressed while knobs K1 and K2 are being operated. Lever L1 is provided with studs ST1 and ST2 and lever L2 with studs ST3 and ST4. These studs lift the various pawls from the ratchet wheels when the levers are depressed, thus allowing the bands to be wound back on the rollers R5 and R7 respectively. Springs SG1 and SG2 return the levers to their normal position.

The circuit of magnet EM1 may be closed for a short time at the end of each unit of time by a contact on a clock carried by the vehicle. Similarly, the circuit of electromagnet EM2 may be closed by a contact operated for a short time at the end of each unit of distance travelled. For the latter purpose a contact may, if desired, be incorporated in an ordinary mileage counter carried by the vehicle.

Figures 5 and 6 illustrate an electrical impulse generating device suitable for attaching either to a clock or to an ordinary mileage counter. In Figure 5, two metal discs D1 and D2 mounted on a spindle A are united by a series of pins E1, E2, E3, E4, etc. The odd numbered pins, E1, E3, etc., are of insulating material while the even numbered pins E2, E4, etc. are metallic. A flat spring F, insulated from the frame FR which carries the spindle A, bears upon the pins, so that, as the discs rotate in the direction of the arrow, it makes contact with insulating and conducting pins alternately. Figure 6 shows the relative positions of the pins and the spring in diagrammatic form, the spring being indicated in three positions, F, FA and FB, relative to the discs. At F it is shown in contact with an insulating pin; at FA it has just fallen on to a conducting pin; and at FB it has just left the conducting pin. If an electric potential is connected to the frame FR, impulses may be taken from the spring F and it will be observed that a quick make and quick break are obtained in the impulsing circuit without imposing more than a light load on the driving mechanism. A spring washer W (Figure 5) is provided to ensure good connection between the disc D1 and the frame FR.

An electro-magnetic step-by-step drive may also be used conveniently in cases in which it is desired to alter the speed of travel of the bands at particular points in their length. If two sources of electrical impulses are available from, say, the clock, one giving an impulse, say, every half-minute, while the other gives an impulse, say, every minute, a simple change-over contact operated at the appropriate point will cause the desired variation in speed.

Having now described our invention, what we claim as new and desire to secure by Letters Patent is:—

1. Apparatus for calculating and continuously displaying the resultant of two variable factors comprising a flexible band moved from a starting position by an amount determined by the value from time to time of one of the said factors, a second flexible band moved from a starting position by an amount determined by the value from time to time of the other of the said factors, a slot through which the bands pass in juxtaposition, an indicating curve carried by one band, and a series of curves carried by the other band upon which the resultant of the said factors is indicated by the said indicating curve.

2. Apparatus for calculating and continuously displaying an indication of average speed in which two flexible bands moved according to time and distance factors respectively carry curves displaced laterally and logarithmically with respect to the direction of movement of the said bands, the two bands being brought together by their passing through a common slot at points in their lengths determined by the values of the time and distance factors respectively so that a single curve carried by one band continuously indicates the required average speed on a logarithmic series of curves carried by the other band.

3. Apparatus according to claim 1 in which the said curves are plotted to allow for a non-uniform rate of motion of the bands by which they are carried with respect to the variable factors by which the said bands are controlled.

4. Apparatus according to claim 2 in which the said bands are moved intermittently by electro-magnetic pawl-and-ratchet mechanism substantially as described.

JOHN FREDRIK TEODOR ENGBLOM.
CHARLES WILFRID WILMAN.